(12) United States Patent
Hung et al.

(10) Patent No.: US 12,494,264 B2
(45) Date of Patent: Dec. 9, 2025

(54) MEMORY DEVICE AND ERROR CORRECTION METHOD THEREOF

(71) Applicant: MACRONIX International Co., Ltd., Hsinchu (TW)

(72) Inventors: Chun-Hsiung Hung, Hsin-Chu (TW); Hsin-Yi Ho, Hsinchu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 97 days.

(21) Appl. No.: 18/666,823

(22) Filed: May 17, 2024

(65) Prior Publication Data

US 2025/0356941 A1    Nov. 20, 2025

(51) Int. Cl.
*G11C 7/12* (2006.01)
*G11C 29/02* (2006.01)
*G11C 29/52* (2006.01)

(52) U.S. Cl.
CPC ............... *G11C 29/52* (2013.01); *G11C 7/12* (2013.01); *G11C 29/022* (2013.01)

(58) Field of Classification Search
CPC .......... G11C 29/52; G11C 7/12; G11C 29/022
USPC .................................................. 365/185.09
See application file for complete search history.

(56) References Cited

U.S. PATENT DOCUMENTS

| | | | |
|---|---|---|---|
| 8,634,247 B1* | 1/2014 | Sprouse | G06F 12/0246 365/185.17 |
| 2015/0033064 A1* | 1/2015 | Davis | G11C 16/3454 714/37 |
| 2018/0261300 A1 | 9/2018 | Shimizu | |

FOREIGN PATENT DOCUMENTS

KR        20060059282        *  6/2006

OTHER PUBLICATIONS

KR20060059282 Translation.*
"Office Action of Taiwan Counterpart Application", issued on Mar. 13, 2025, p. 1-p. 5.

* cited by examiner

Primary Examiner — Alexander Sofocleous
Assistant Examiner — Duy H Luong
(74) Attorney, Agent, or Firm — J.C. PATENTS (57) ABSTRACT

Disclosed are a memory device and an error correction method thereof. The error correction method of the memory device includes: generating a first write-in bit and a second write-in bit according to a write-in data, and writing the first write-in bit and the second write-in bit into corresponding first memory cell and second memory cell respectively; in a reading mode, providing a page buffering circuit to read a first read bit and a second read bit from the first memory cell and the second memory cell; and providing the page buffering circuit to generate a correct readout data according to a stuck-at fault mode of the memory device, the first read bit and the second read bit.

17 Claims, 8 Drawing Sheets

MEMORY DEVICE AND ERROR CORRECTION METHOD THEREOF

BACKGROUND

Technical Field

The present disclosure relates to a memory device and an error correction method thereof, and in particular, to a memory device and an error correction method thereof that are able to quickly correct readout data.

Description of Related Art

In a memory device, occurrence of a few defect memory cells are sometimes inevitable. In the conventional technical field, the readout data generated from the defect memory cells may be corrected by performing related error correction operations through error-correction code (ECC) and the corresponding circuit. However, in current applications, for example, when a memory device is applied to high-speed multiplication and accumulation operations, the error correction operation performed through the ECC algorithm might cause delays in the operation and reduce the performance of the memory device.

SUMMARY

The present disclosure provides a memory device and an error correction method thereof, which are able to quickly and effectively improve the accuracy of readout data.

The present disclosure provides an error correction method of a memory device. The error correction method of the memory device includes: generating a first write-in bit and a second write-in bit according to a write-in data, and writing the first write-in bit and the second write-in bit into a corresponding first memory cell and a corresponding second memory cell respectively; in a reading mode, providing a page buffering circuit to read a first read bit from the first memory cell and a second read bit from the second memory cell; and providing the page buffering circuit to generate a correct readout data according to a stuck-at fault mode of the memory device, the first read bit and the second read bit.

The memory device of the present disclosure includes a memory cell array and a page buffering circuit. The memory cell array includes a plurality of memory cells, wherein the first memory cell and the second memory cell correspond to the same word line, and the first memory cell and the second memory cell are respectively configured to store the first write-in bit and the second write-in bit corresponding to the write-in data. The page buffering circuit is coupled to the first bit line and the second bit line of the corresponding first memory cell and the second memory cell respectively. The page buffering circuit reads the first read bit from the first memory cell and reads the second read bit from the second memory cell in the read mode, and generates the correct readout data according to the stuck-at fault mode of the memory device, the first read bit and the second read bit.

Based on the above, the memory device of the present disclosure stores single write-in data through two memory cells. The memory device of the present disclosure provides a corresponding page buffering circuit to generate a reading mechanism for readout data according to a stuck-at fault mode of the memory device. In this way, the page buffering circuit is able to quickly correct the read bit generated by the memory cell in the memory device and obtain correct readout data.

DESCRIPTION OF THE EMBODIMENTS

Figure 1:
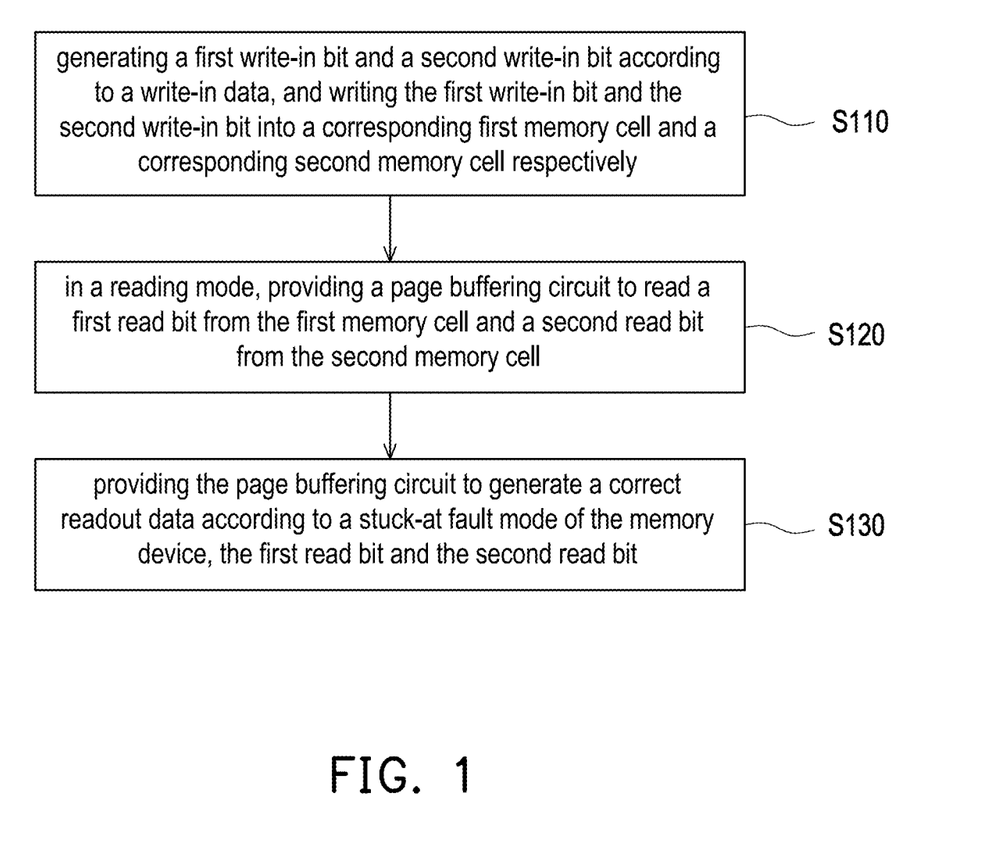
FIG. 1 is a flowchart illustrating an error correction method of a memory device according to an embodiment of the present disclosure.

Please refer to FIG. 1. FIG. 1 is a flowchart of an error correction method of a memory device according to an embodiment of the present disclosure. In step S110, a memory device may generate a first write-in bit and a second write-in bit according to a write-in data, and write the first write-in bit and the second write-in bit respectively to the corresponding first memory cell and the second memory cell. In the memory device of this embodiment, two corresponding memory cells may be used to jointly store the same write-in data. For example, in the memory device of the embodiment of the present disclosure, the first memory cell and the second memory cell connected to the same word line may be used to store the write-in data, and the first memory cell and the second memory cell may be respectively located on adjacent bit lines. The memory device may generate the first write-in bit and the second write-in bit according to the write-in data, and the first write-in bit and the second write-in bit may have the same logic value, for example. Furthermore, the first write-in bit and the second write-in bit are written into the first memory cell and the second memory cell respectively.

In step S120, in the read mode of the memory device, by enabling the word line to which the first memory cell and the second memory cell are jointly coupled to, the memory device may provide the page buffering circuit corresponding to the first memory cell and the second memory cell to read the first read bit provided by the first memory cell and the second read bit provided by the second memory cell. In step S130, the page buffering circuit may generate correct readout data according to the stuck-at fault mode of the memory device, the first read bit and the second read bit.

In this embodiment, depending on different process conditions, the memory device may have different stuck-at fault modes, such as a stuck-at fault mode sticking to a logic value 1 or a stuck-at fault mode sticking to a logic value 0. In step S130, the page buffering circuit of the memory device may generate the correct readout data according to the stuck-at fault mode of the memory device as well as the obtained first read bit and second read bit.

Please note here that in a memory device, since the defect memory cells in the stuck-at fault mode are randomly scattered at different positions in the memory cell array, it is very rare that the first memory cell and the second memory cell both connected to the same word line and located on adjacent bit lines are defect memory cells. Therefore, by storing the write-in data through the first memory cell and the second memory cell jointly, it is possible to ensure the correctability of the write-in data.

In detail, when the stuck-at fault mode of the memory device sticks to a logic value 1 (that is, the stuck logic value of the stuck-at fault mode is equal to a logic value 1), it means that all the read bits provided by the defect memory cells are a logic value 1. Under such conditions, when the page buffering circuit determines that one of the first read bit and the second read bit is a logic value 1, and the other one of the first read bit and the second read bit is not a logic value 1 (but a logic value 0), the page buffering circuit may determine that the read bit that generates a logic value 1 among the first memory cell and the second memory cell is a defect memory cell; and the read bit that generates a logic value 0 is the correct memory cell. In this way, the page buffering circuit may generate the readout data with a logic value 0.

When the stuck-at fault mode of the memory device sticks to a logic value 0 (that is, the stuck logic value of stuck-at fault mode is equal to a logic value 0), it means that all the read bits provided by the defect memory cells are a logic value 0. Under such conditions, when the page buffering circuit determines that one of the first read bit and the second read bit is a logic value 0, and the other one of the first read bit and the second read bit is not a logic value 0 (but a logic value 1), the page buffering circuit may determine that the read bit that generates a logic value 0 among the first memory cell and the second memory cell is a defect memory cell; and the read bit that generates a logic value 1 is the correct memory cell. In this way, the page buffering circuit may generate the readout data with a logic value 1.

Incidentally, no matter what the stuck-at fault mode of the memory device is, in this embodiment, if the first read bit and the second read bit are both of the same logic value (logic value 1 or 0), it means that the first memory cell and the second memory cell are normal memory cells, and the page buffering circuit may generate the readout data based on the same logic value of the first read bit and the second read bit.

Figure 2:
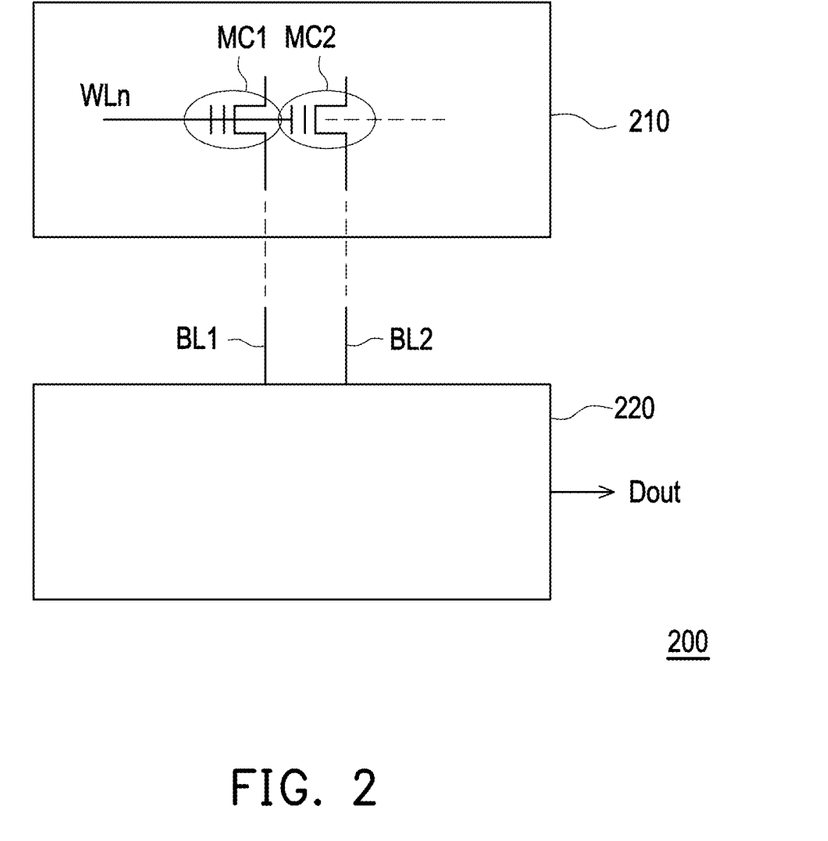
FIG. 2 is a schematic diagram of a memory device according to an embodiment of the present disclosure.

Please refer to FIG. 2. FIG. 2 is a schematic diagram of a memory device according to an embodiment of the present disclosure. The memory device 200 includes a memory cell array 210 and a page buffering circuit 220. The memory cell array 210 includes a plurality of memory cells, wherein in corresponding to a write-in data, a memory cell MC1 and a memory cell MC2 in the memory cell array 210 may be configured to store the first write-in bit and the second write-in bit generated according to the write-in data. For example, assuming that the write-in data is logic value 1, the first write-in bit and the second write-in bit both may be of the same logic value 1 and be written to the memory cell MC1 and the memory cell MC2 respectively. Taking the write-in data as a logic value 0 as an example, the first write-in bit and the second write-in bit both may be the same logic value 0 and be written to the memory cell MC1 and the memory cells MC2 respectively.

In addition, the memory cell MC1 and the memory cell MC2 are coupled to the same word line WLn and respectively coupled to a bit line BL1 and a bit line BL2 adjacent to each other. In the memory device 200, since the defect memory cells in the stuck-at fault mode are randomly scattered at a plurality of different positions in the memory cell array 210, it is very rare that both of the memory cell MC1 and the memory cell MC2 are defect memory cells.

The page buffering circuit 220 is coupled to the memory cell MC1 and the memory cell MC2 through the bit line BL1 and the bit line BL2. Moreover, in the read mode, the page buffering circuit 220 may determine whether there are defect memory cells in the memory cell MC1 and the memory cell MC2 according to the first read bit and the second read bit transmitted by the memory cell MC1 and the memory cell MC2 based om the stuck-at fault mode of the memory device 200, and generate the readout data Dout by outputting the read bit of the correct memory cell, thereby ensuring the correctness of the readout data Dout.

It is worth noting that in the embodiment of the present disclosure, the page buffering circuit 220 may quickly correct the first read bit and the second read bit transmitted by the memory cell MC1 and the memory cell MC2 through determining the stuck logic value of the stuck-at fault mode and the logic values of the first read bit and the second read bit, thereby generating the correct readout data Dout. It is possible to complete the error correction operation of the readout data Dout without having to apply complex error-correction code (ECC) calculation operations. In this way, the working performance of the memory device 200 may be improved.

Incidentally, the stuck-at fault mode of the memory device 200 is determined according to the manufacturing process of the memory device 200. The designer may acquire the stuck-at fault mode of the memory device 200 according to the manufacturing process of the memory device 200, and design the page buffering circuit 220 to perform corresponding operations according to the stuck-at fault mode of the memory device 200 and effectively complete the error correction operation on the readout data Dout.

Figure 3:
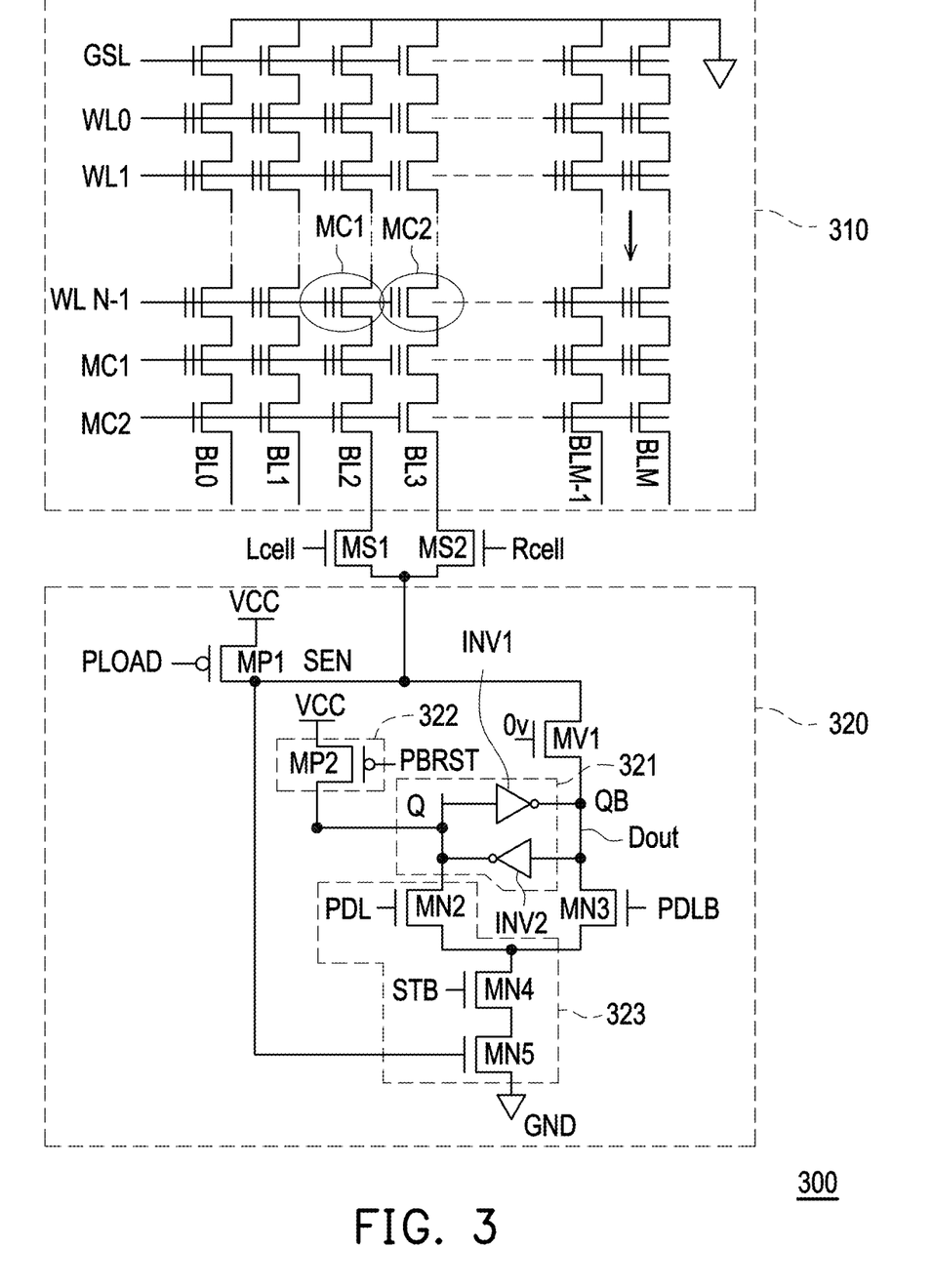
FIG. 3 is a schematic circuit diagram of an embodiment of a memory device of the present disclosure.

Please refer to FIG. 3 below. FIG. 3 is a schematic circuit diagram of an embodiment of a memory device of the present disclosure. The memory device 300 includes a memory cell array 310 and a page buffering circuit 320. In this embodiment, the memory cell array 310 is, for example, a NAND flash memory cell array. In other embodiments of the present disclosure, the memory cell array 310 may also be a memory array in any other form, and there are no particular limitations.

The memory cell array 310 has a plurality of memory cell strings, and each of the plurality of memory cell strings is coupled to a word line WL0 to a word line WLN. Each of the plurality of memory cell strings has a ground selection switch and a memory cell string selection switch at both ends. The ground selection switch and the memory cell string selection switch are respectively controlled by the ground control signal GSL and the memory cell string selection signal SSL. The ground selection switch and the memory cell string selection switch are respectively coupled to the reference ground voltage GND and the corresponding bit line BL0 to the bit line BLM.

On the other hand, the page buffering circuit 320 is coupled to the bit line BL2 and the bit line BL3 through the switch MS1 and the switch MS2, respectively. Both the switch MS1 and the switch MS2 may be transistor switches. The page buffering circuit 320 is configured to read the read bits transmitted by the memory cells on the bit line BL2 and the bit line BL3, and generate the readout data Dout accordingly.

In terms of details of the circuit, the page buffering circuit 320 of this embodiment is configured by corresponding to the memory device 300 in the stuck-at fault mode which sticks to a logic value 0. The page buffering circuit 320 includes a sensing signal generator constructed by a transistor MP1, a data holder 321, a pull-up switch 322 and a pull-down circuit 323. One end of the transistor MP1 receives a power voltage VCC; the other end of the transistor MP1 is coupled to the switch MS1 and the switch MS2 and is configured to generate a sensing signal SEN; a control terminal of the transistor MP1 receives a signal PLOAD. The pull-up switch 322 is coupled to an inverted data output terminal Q of the data holder 321. The pull-up switch 322 consists of a transistor MP2. A first terminal of the transistor MP2 receives the power voltage VCC; a second terminal of the transistor MP2 is coupled to the inverted data output terminal Q of the data holder 321; the transistor MP2 is controlled by a reset signal PBRST.

The pull-down circuit 323 includes a transistor MN2, a transistor MN4 and a transistor MN5. The transistor MN2, the transistor MN4 and the transistor MN5 are connected in series between the inverted data output terminal Q of the data holder 321 and the reference ground voltage GND. The transistor MN2, the transistor MN4 and the transistor MN5 are respectively controlled by a signal PDL, a signal STB and the sensing signal SEN.

Incidentally, the page buffering circuit 320 also includes a transistor MN1 and a transistor MN3. The transistor MN1 is coupled between a data output terminal QB of the data holder 321 and the transistor MP1. In this embodiment, a control terminal of the transistor MN1 receives a bias voltage of 0V and is in a cut-off state. The transistor MN3 is coupled between the data output terminal QB of the data holder 321 and the transistor MN4. In this embodiment, the control terminal of the transistor MN3 receives the signal PDLB of 0V and is also in a cut-off state.

Figure 4:
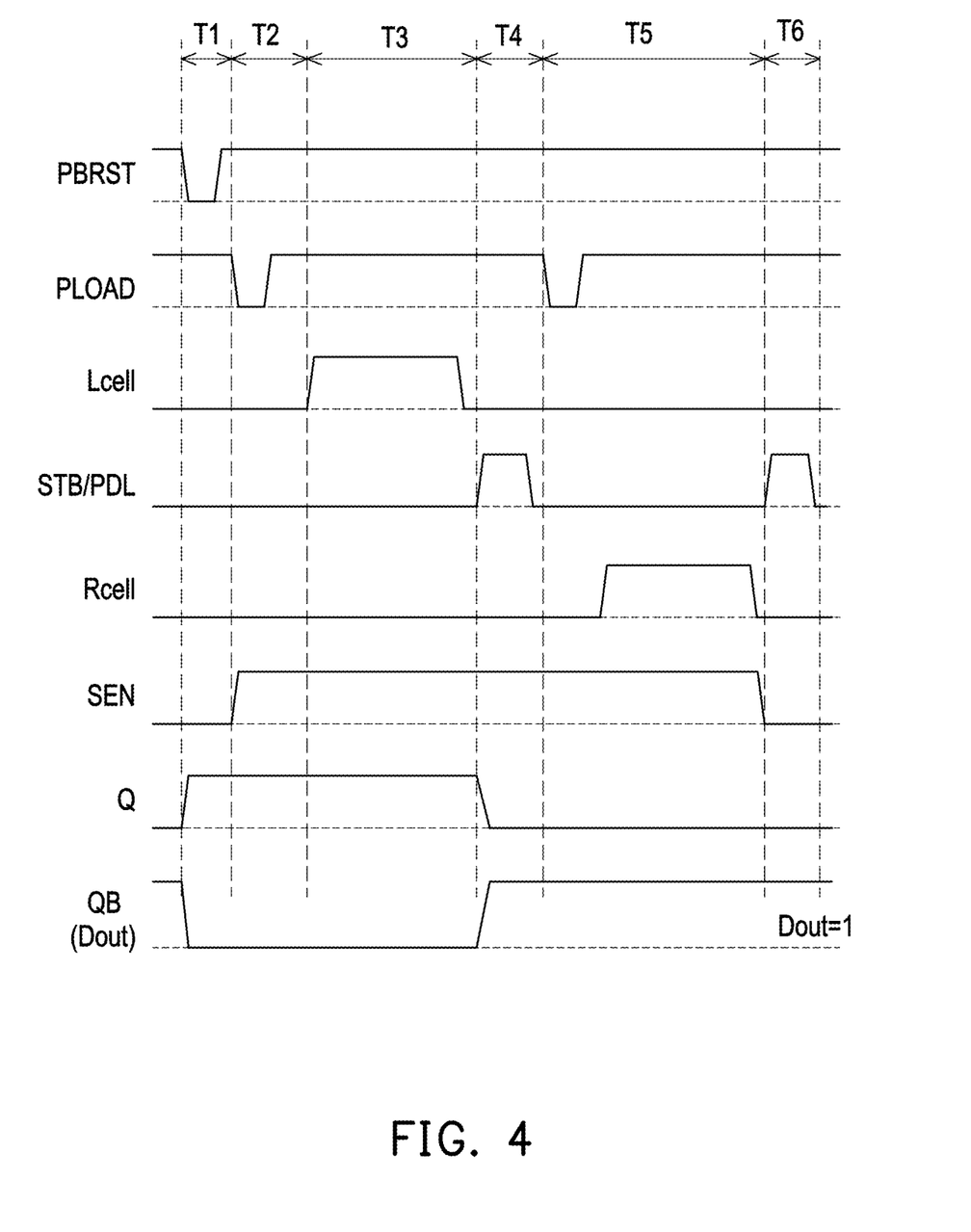
FIG. 4 shows an operation waveform diagram of a memory device 300 according to the embodiment of FIG. 3 of the present disclosure.

Regarding the operation details of the of the memory device 300, please refer to FIG. 3 and FIG. 4 both. FIG. 4 shows an operation waveform diagram of the memory device 300 according to the embodiment of FIG. 3 of the present disclosure. In FIG. 4, in a time interval T1, the reset signal PBRST is pulled low and enters the reset period, causing the transistor MP2 to be turned on. Accordingly, the voltage on the inverted data output terminal Q of the data holder 321 is pulled up (for example, equal to the power voltage VCC). Correspondingly, the readout data Dout on the data output terminal QB of the data holder 321 is pulled low.

In a time interval T2, the signal PLOAD is pulled low and the transistor MP1 is turned on. Correspondingly, the transistor MP1 may provide the power voltage VCC to generate the sensing signal SEN, and cause the sensing signal SEN to be pulled up to the power voltage VCC.

In a time interval T3, the switch MS1 is turned on according to the high control signal Lcell. When the word line WLN-1 is enabled, the memory cell MC1 provides a first read bit to the bit line BL2. The first read bit is transmitted to a second terminal of the transistor MP1 through the turned-on switch MS1. Taking the first read bit with a logic value 1 as an example, the first read bit may maintain the sensing signal SEN with a logic value 1.

In a time interval T4, the signal STB and the signal PDL are pulled up to a logic value 1, and the transistor MN2 and the transistor MN4 are turned on correspondingly. Based on the sensing signal SEN also having a logic value 1, the transistor MN5 is also turned on synchronously. Accordingly, the pull-down circuit 323 provides a discharge path between the inverted data output terminal Q and the reference ground voltage GND, and causes the voltage on the inverted data output terminal Q to be pulled down to the reference ground voltage GND. Correspondingly, the readout data Dout on the data output terminal QB of the data holder 321 is pulled up to a logic value 1.

Through the above operations, the memory device 300 may load the read bit provided by the read memory cell MC1 through the page buffering circuit 320 during the time intervals T3 to T4. When the read bit provided by the memory cell MC1 is different from the stuck logic value of the stuck-at fault mode of the memory device 300, the page buffering circuit 320 may write the read bit provided by the memory cell MC1 into the data holder 321.

At the beginning of the time interval T5, the signal PLOAD is pulled down again, and the loading operation of the read bit of the next memory cell MC2 is activated.

Corresponding to the signal PLOAD that is pulled down again, the transistor MP1 is turned on, and the sensing signal SEN maintains at a logic value 1. Then, after the signal PLOAD returns to a logic value 1, the control signal Rcell is pulled up to a logic value 1, and the switch MS2 is turned on correspondingly. The read bit of memory cell MC2 may be transmitted to the page buffering circuit 320 through the switch MS2. In this embodiment, the memory cell MC2 is a defect memory cell, and the read bit generated thereby is stuck to a logic value 0. Therefore, in the subsequent time interval T5, the sensing signal SEN is correspondingly pulled down to a logic value 0.

In the time interval T5, based on the sensing signal SEN being a logic value 0, the transistor MN5 is turned off, and the discharge path formed by the pull-down circuit 323 is cut off. Therefore, the voltage on the inverted data output terminal Q of the data holder 321 does not change. In contrast, the data output terminal QB of the data holder 321 keeps generating the readout data Dout.

That is to say, in this embodiment, when the read bit provided by the memory cell MC2 is the same as the stuck logic value of the stuck-at fault mode of the memory device 300, the page buffering circuit 320 may ignore the read bit provided by the memory cell MC2.

In addition, in the time interval T5, the signal STB and the signals PDL are pulled up to a logic value 1, and the page buffering circuit 320 may generate the readout data Dout with a logic value 1.

By the way, in this embodiment, the data holder 321 includes an inverter INV1 and an inverter INV2, wherein an input terminal of the inverter INV1 is an inverting data output terminal Q of the data holder 321, and an input terminal of the inverter INV2 is an output terminal QB of the data holder 321. The output terminal of the inverter INV1 is coupled to the input terminal of the inverter INV2, and the input terminal of the inverter INV1 is coupled to the output terminal of the inverter INV2.

Please refer to the following table, which is the truth table of the data reading operation in this embodiment:

|  | MC1 | MC2 | Expected readout data | Q | QB = Dout |
|---|---|---|---|---|---|
| Write-in data = "0" | 0 | 0 | 0 | 1 | 0 |
| MC2 sticks to "0" | 0 | 0 | 0 | 1 | 0 |
| Write-in data = "1" | 1 | 1 | 1 | 0 | 1 |
| MC2 sticks to "0" | 1 | 0 | 1 | 0 | 1 |

Regardless of whether the writing-in data is logic value 1 or 0, under the condition that an error occurs in the memory cell MC2, through the page buffering circuit 320 of the embodiment of the present disclosure, a readout data Dout equal to the expected readout data may be obtained.

Figure 5:
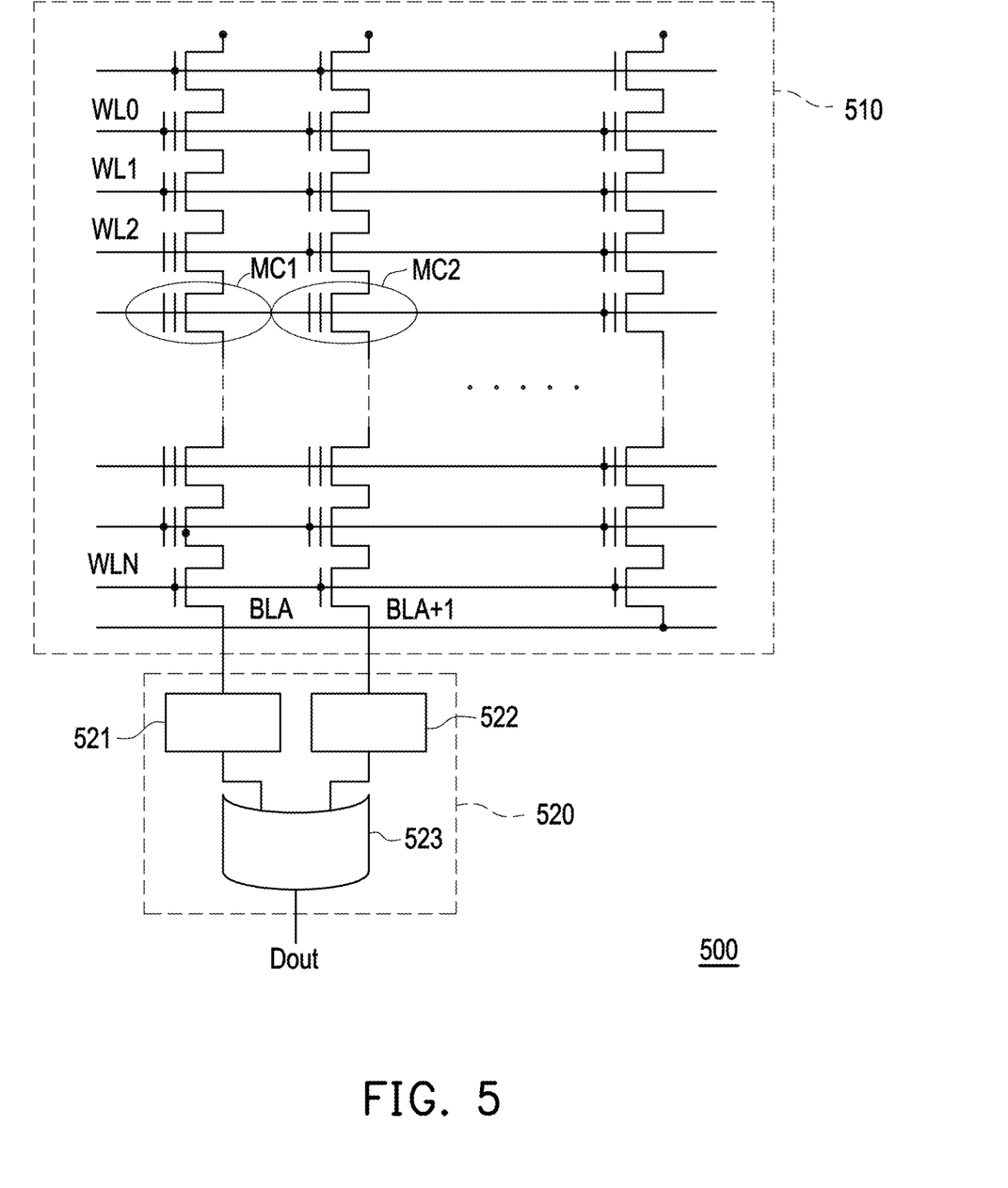
FIG. 5 is a schematic circuit diagram of another embodiment of a memory device of the present disclosure.

Please refer to FIG. 5 below. FIG. 5 is a schematic circuit diagram of another embodiment of a memory device of the present disclosure. A memory device 500 includes a memory cell array 510 and a page buffering circuit 520. In this embodiment, the memory cell array 510 may have the same circuit architecture as the memory cell array 310, and the relevant details will not be described again.

The page buffering circuit 520 of this embodiment is configured by corresponding to the memory device 500 in the stuck-at fault mode which sticks to a logic value 0. In this embodiment, the page buffering circuit 520 includes a buffer 521, a buffer 522 and a logic circuit 523. The buffer 521 and the buffer 522 are coupled to a bit line BLA and a bit line BLA+1 respectively. The bit line BLA and the bit line BLA+1 correspond to the memory cell MC1 and the memory cell MC2 respectively. The buffer 521 and the buffer 522 are configured to receive and temporarily store the read bits generated by the memory cell MC1 and the memory cell MC2. In addition, the logic circuit 523 may perform an OR logic operation on the read bits temporarily stored in the buffer 521 and the buffer 522, thereby generating the readout data Dout. The truth table of the logic operation of the page buffering circuit 520 is as follows:

|  | MC1 | MC2 | Dout |
|---|---|---|---|
| MC2 sticks to "0" Write-in data "1" | 1 | 0 | 1 |
| Write-in data "0" | 0 | 0 | 0 |
| No defect memory cell Write-in data "1" | 1 | 1 | 1 |

In this embodiment, the logic circuit 523 may be an OR logic gate or a combination of multiple logic gates that are able to perform an OR logic operation on the read bits temporarily stored in the buffer 521 and the buffer 522. For example, the logic circuit 523 may be composed of an NOR gate and an inverter connected in series, or may be composed of other combinations of logic gates, and there is no particular limitation.

Incidentally, there may be a plurality of page buffering circuits 520 in the memory device 500 according to an embodiment of the present disclosure, and the plurality of page buffering circuits 520 are respectively coupled to corresponding two-bit lines. The single page buffering circuit 520 shown in FIG. 5 is only an example for illustration and is not intended to limit the scope of the present disclosure. The designer may determine the number of page buffering circuits 520 that need to be provided based on the actual number of bit lines of the memory device 500.

Figure 6:
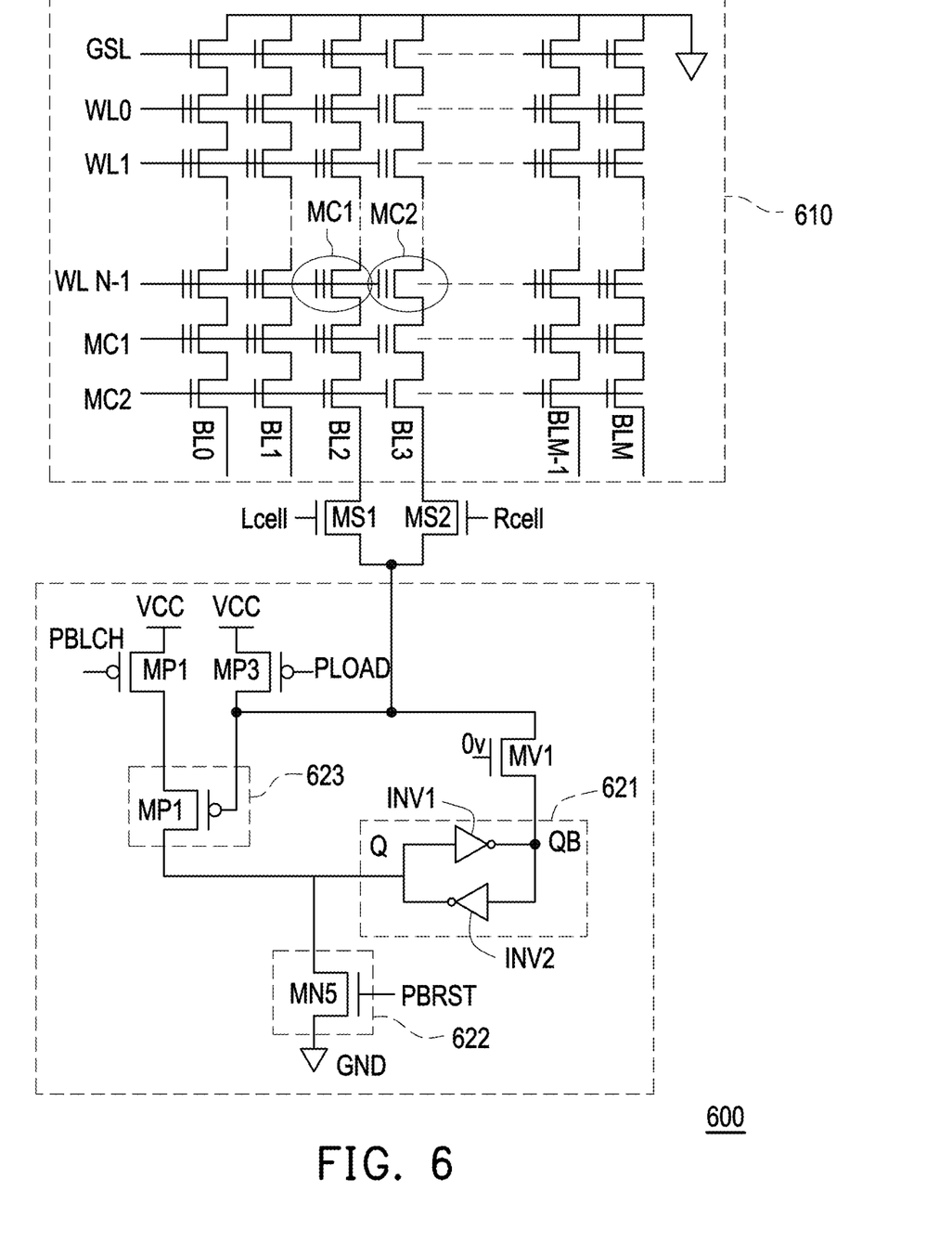
FIG. 6 is a schematic circuit diagram of a memory device according to another embodiment of the present disclosure.

Please refer to FIG. 6, which is a schematic circuit diagram of a memory device according to another embodiment of the present disclosure. The memory device 600 includes a memory cell array 610 and a page buffering circuit 620. In this embodiment, the memory cell array 610 and the memory cell array 310 have a similar circuit structure, and related details will not be described in detail here.

On the other hand, the page buffering circuit 620 is coupled to the bit line BL2 and the bit line BL3 through the switch MS1 and the switch MS2, respectively. Both the switch MS1 and the switch MS2 may be transistor switches. The page buffering circuit 320 is configured to read the read bits transmitted by the memory cells on the bit line BL2 and the bit line BL3, and generate the readout data Dout accordingly.

In terms of details of the circuit, the page buffering circuit 620 of this embodiment is configured by corresponding to the memory device 600 in the stuck-at fault mode which sticks to a logic value 1. The page buffering circuit 620 includes a data holder 621, a pull-up switch 623 and a pull-down circuit 622. The pull-up switch 623 may be constructed from the transistor MP2. The control terminal of the transistor MP2 is coupled to the power voltage VCC through the transistor MP3; the first terminal of the transistor MP2 is coupled to the power voltage VCC through the transistor MP1. The transistor MP1 and the transistor MP3 are controlled by the signal PBLCH and the signal PLOAD respectively.

The second terminal of the transistor MP2 is coupled to the inverting data output terminal Q of the data holder 612. The pull-down circuit 622 is coupled between the inverting data output terminal Q of the data holder 612 and the reference ground voltage GND. The pull-down circuit 622 is composed of a transistor MN. The transistor MN is controlled by the reset signal PBRST. In addition, the page buffering circuit 620 further includes a transistor MN1. The transistor MN1 is coupled between the control terminal of the transistor MP2 and the output terminal QB of the data holder 612. The control terminal of the transistor MN1 receives a voltage of 0V and is in a cut-off state.

Figure 7:
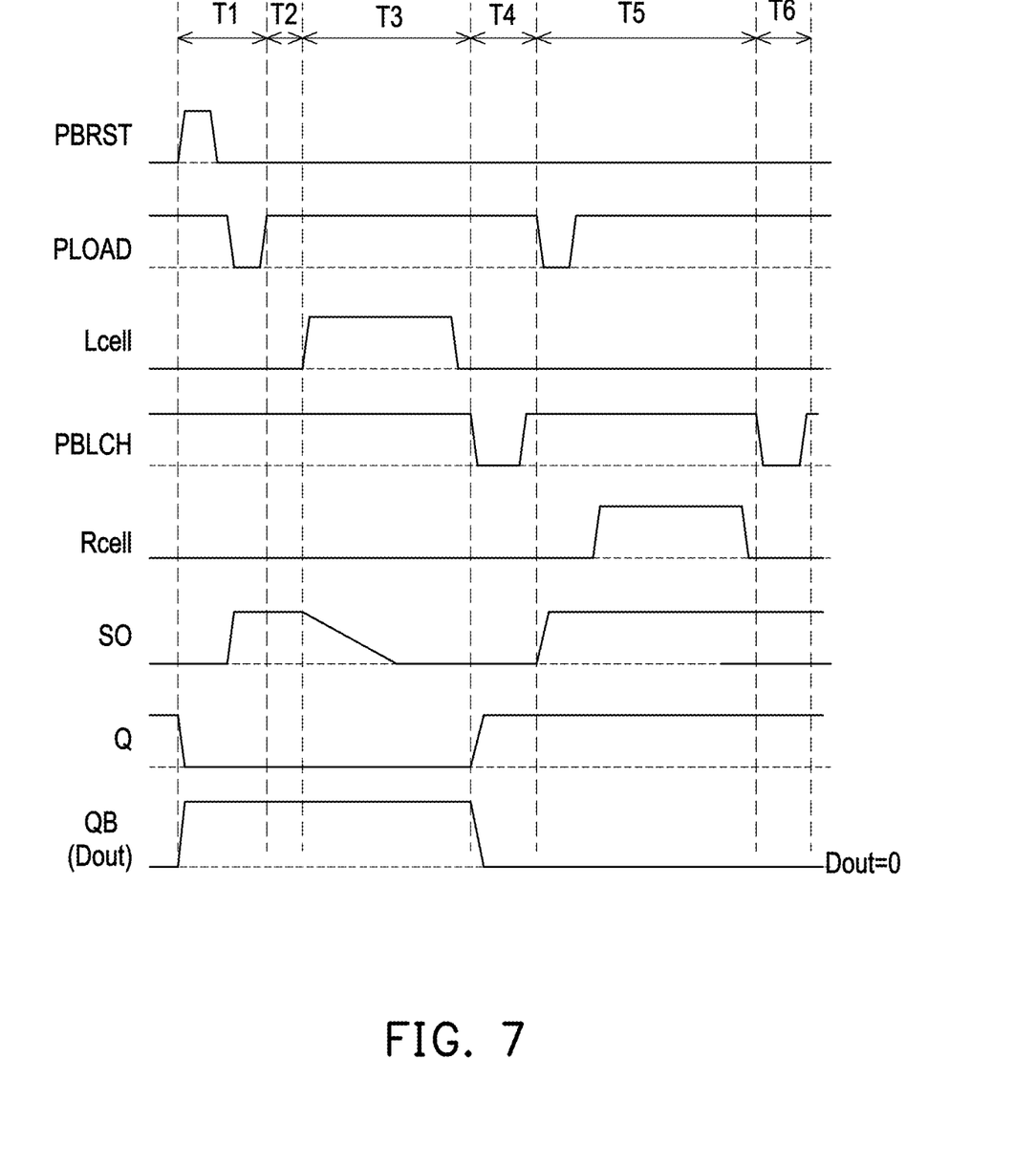
FIG. 7 shows an operation waveform diagram of a memory device 600 according to the embodiment of FIG. 6 of the present disclosure.

Regarding the operation details of the memory device 600, please refer to FIG. 6 and FIG. 7 simultaneously. FIG. 7 shows an operation waveform diagram of the memory device 600 according to the embodiment of FIG. 6 of the present disclosure. In FIG. 7, in the time interval T1, the reset signal PBRST is pulled up to a logic value 1 and enters the reset period. Correspondingly, the transistor MN2 is turned on, causing the inverting data output terminal Q of the data holder 612 to have a logic value 0. Correspondingly, the output terminal QB of the data holder 612 is a logic value 1.

Next, after the reset signal PBRST is pulled down to a logic value 0, the signal PLOAD is pulled down to a logic value 0, and the transistor MP3 is turned on. Under the circumstances, the turned-on transistor MP3 provides the power voltage VCC to the control terminal of the transistor MP2, causing a signal SO to be pulled up to a logic value 1, and causing the transistor MP2 to be turned off.

In the time interval T2, the signal SO maintains at a logic value 1. In the time interval T3, the control signal Lcell is pulled up so that the switch MS1 is turned on. Correspondingly, the memory cell MC1 provides a read bit, for example, with a logic value 0, to the control terminal of the transistor MP2, and causes the signal SO to be pulled down.

As the signal SO is pulled down, the transistor MP2 is changed to be turned on. In the time interval T3, the signal PBLCH maintains at a logic value 1, and the transistor MP1 is in a cut-off state. Therefore, the voltages on the inverting data output terminal Q and the output terminal QB of the data holder 612 do not change.

In the time interval T4, the signal PBLCH is pulled down to a logic value 0, and the transistor MP1 is correspondingly turned on and pulls up the first terminal of the transistor MP2 to the power voltage VCC. Based on the current conductive state of the transistor MP2, the voltage on the inverting data output terminal Q of the data holder 612 may be pulled up to a logic value 1, in contrast, the voltage on the output terminal QB of the data holder 612 may be pulled down to a logic value 0.

In the first part of the time interval T5, the signal PLOAD is pulled down again to turn on the transistor MP3, and the signal SO is pulled up again through the transistor MP3. Then, the control signal Rcell is pulled up to a logic value 1 so that the switch MS2 is turned on. Correspondingly, the memory cell MC2 may provide a read bit, which is transmitted to the control terminal of the transistor MP2 through the switch MS2. Based on the fact that the read bit provided by the memory cell MC2 sticks to a logic value 1, the signal SO may remain at a logic value 1 without changing.

In the time interval T6, the signal PBLCH is pulled down so that the transistor MP1 is turned on. Since the transistor MP2 is controlled by the signal SO having a logic value 1 under the circumstances, the conduction operation on the transistor MP1 does not affect the voltage on the inverting data output terminal Q of the data holder 612. Here, the page buffering circuit 620 may generate the readout data Dout equal to a logic value 0.

Please refer to the following table, which is the truth table of the data reading operation in this embodiment:

| | MC1 | MC2 | Expected readout data | Q | QB = Dout |
|---|---|---|---|---|---|
| Write-in data = "0" | 0 | 0 | 0 | 1 | 0 |
| MC2 sticks to "1" | 0 | 1 | 0 | 1 | 0 |
| Write-in data = "1" | 1 | 1 | 1 | 0 | 1 |
| MC2 sticks to "1" | 1 | 1 | 1 | 0 | 1 |

Regardless of whether the write-in data is a logic value 1 or 0, under the condition that an error occurs in the memory cell MC2, through the page buffering circuit 620 of the embodiment of the present disclosure, a readout data Dout equal to the expected readout data may be obtained.

Figure 8:
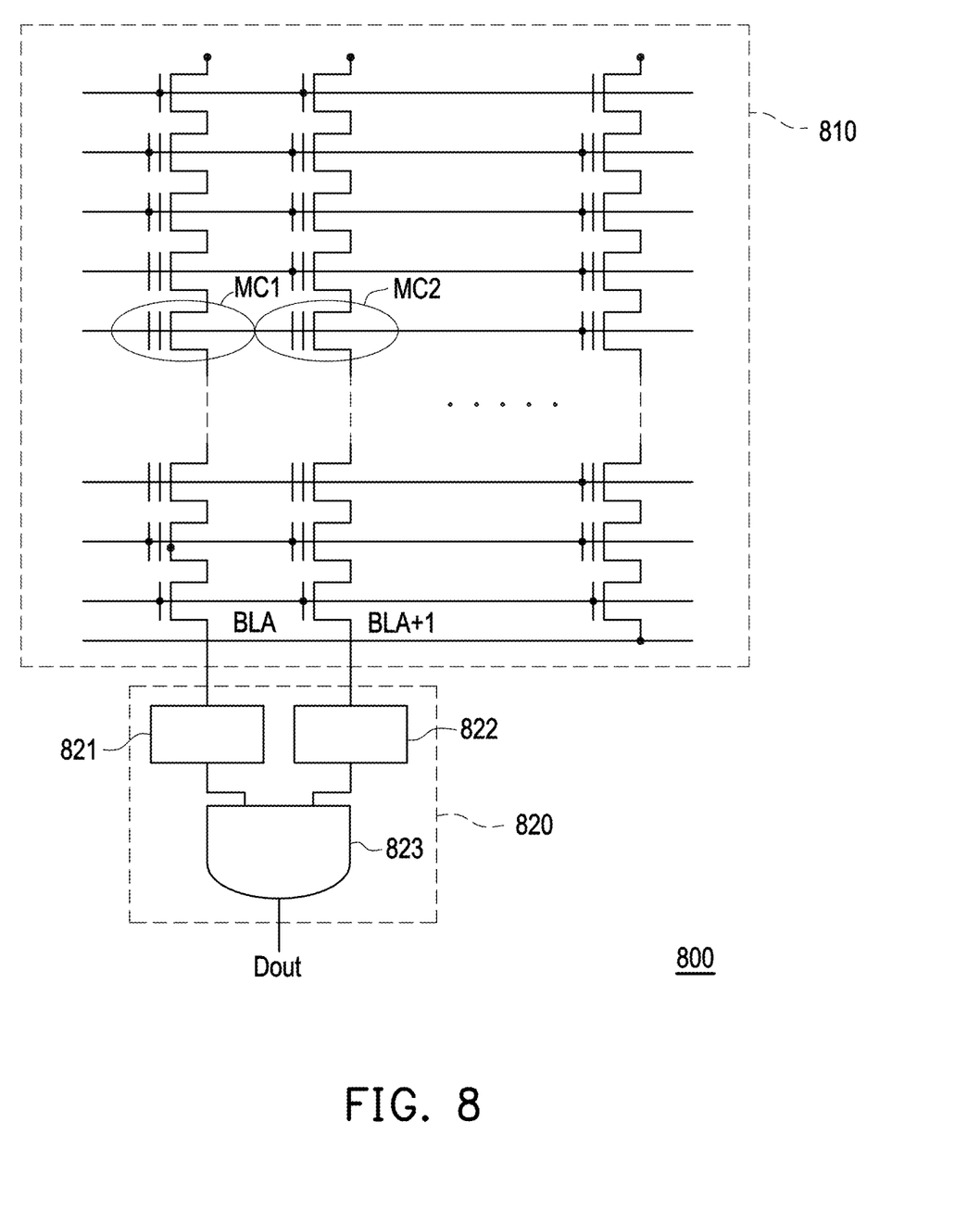
FIG. 8 is a schematic circuit diagram of another embodiment of a memory device of the present disclosure.

Please refer to FIG. 8 below, which is a schematic circuit diagram of another embodiment of a memory device of the present disclosure. A memory device 800 includes a memory cell array 810 and a page buffering circuit 820. In this embodiment, the memory cell array 810 may have the same circuit architecture as the memory cell array 610, and the relevant details will not be described again.

The page buffering circuit 820 of this embodiment is configured by corresponding to the memory device 800 in the stuck-at fault mode which sticks to a logic value 1. In the embodiment, the page buffering circuit 820 includes a buffer 821, a buffer 822 and a logic circuit 823. The buffer 821 and the buffer 822 are coupled to the bit line BLA and the bit line BLA+1 respectively. The bit line BLA and the bit line BLA+1 correspond to the memory cell MC1 and the memory cell MC2 respectively. The buffer 821 and the buffer 822 are configured to receive and temporarily store the read bits generated by the memory cell MC1 and the memory cell MC2. In addition, the logic circuit 823 may perform an AND logic operation on the read bits temporarily stored in the buffer 821 and the buffer 822, thereby generating the readout data Dout. The truth table of the logic operation of the page buffering circuit 820 is as follows:

| | MC1 | MC2 | Dout |
|---|---|---|---|
| MC2 sticks to "1" Write-in data "1" | 1 | 1 | 1 |
| Write-in data "0" | 0 | 1 | 0 |
| No defect memory cell Write-in data "1" | 1 | 1 | 1 |

In this embodiment, the logic circuit 823 may be an OR logic gate or a combination of multiple logic gates that are able to perform an OR logic operation on the read bits temporarily stored in the buffer 821 and the buffer 822. For example, the logic circuit 823 may be composed of an NAND gate and an inverter connected in series, or may be composed of other combinations of logic gates, and there is not particular limitation.

In summary, the memory device of the present disclosure stores single write-in data through two memory cells. Moreover, a page buffering circuit is provided for the stuck-at fault mode of the memory device. Through the page buffering circuit, it is possible to quickly complete correction of the read bit through the stuck logic value of the stuck-at fault mode and the two read bits read from the memory cell, thereby obtaining correct readout data.

What is claimed is:

1. An error correction method of a memory device, comprising:
   generating a first write-in bit and a second write-in bit according to a write-in data, and writing the first write-in bit and the second write-in bit into a corresponding first memory cell and a corresponding second memory cell respectively;
   in a reading mode, providing a page buffering circuit to read a first read bit from the first memory cell and a second read bit from the second memory cell; and
   providing the page buffering circuit to generate a correct readout data according to a stuck-at fault mode of the memory device, the first read bit and the second read bit.

2. The error correction method according to claim 1, wherein the stuck-at fault mode comprises a read bit corresponding to a defect memory cell of the memory device, wherein the read bit sticks to a logic value 1 or sticks to a logic value 0.

3. The error correction method according to claim 1, wherein the step of providing the page buffering circuit to generate the correct readout data according to the stuck-at fault mode of the memory device, the first read bit and the second read bit comprises:
   when a stuck logic value of the stuck-at fault mode is the same as one of the first read bit and the second read bit, generating the readout data according to the other one of the first read bit and the second read bit.

4. The error correction method according to claim 3, further comprising:
   when the first read bit is different from the stuck logic value, making the readout data to be equal to the first read bit; and
   when the second read bit is the same as the stuck logic value, ignoring the second read bit.

5. The error correction method according to claim 3, further comprising:
   when the stuck logic value is a logic value 1, making the first read bit and the second read bit to perform an AND logic operation to generate the readout data.

6. The error correction method according to claim 3, further comprising:
   when the stuck logic value is a logic value 0, making the first read bit and the second read bit to perform an OR logic operation to generate the readout data.

7. The error correction method according to claim 1, wherein the first memory cell and the second memory cell are coupled to a same word line and are respectively disposed on adjacent bit lines, the first write-in bit and the second write-in bit have a same logic value.

8. A memory device, comprising:
- a memory cell array comprising a plurality of memory cells, wherein a first memory cell and a second memory cell correspond to a same word line, wherein the first memory cell and the second memory cell are respectively configured to store a first write-in bit and a second write-in bit corresponding to a write-in data; and
- a page buffering circuit coupled to a first bit line and a second bit line corresponding to the first memory cell and the second memory cell respectively, wherein the page buffering circuit reads a first read bit from the first memory cell and reads a second read bit from the second memory cell in a read mode, and generates a correct readout data according to a stuck-at fault mode of the memory device, the first read bit and the second read bit.

9. The memory device according to claim 8, wherein the stuck-at fault mode comprises a read bit corresponding to a defect memory cell of the memory device, wherein the read bit sticks to a logic value 1 or sticks to a logic value 0.

10. The memory device according to claim 8, wherein when a stuck logic value of the stuck-at fault mode is the same as one of the first read bit and the second read bit, the page buffering circuit generates the readout data according to the other one of the first read bit and the second read bit.

11. The memory device according to claim 8, wherein when a stuck logic value of a defect memory cell of the memory device is a logic value 0, the page buffering circuit comprising:
- a sensing signal generator coupled to the first memory cell and the second memory cell respectively through a plurality of switches, and setting a logic value of a sensing signal according to the first read bit and the second read bit;
- a data holder having a data output terminal and an inverted data output terminal, wherein the data output terminal of the data holder is configured to output the readout data;
- a pull-down circuit coupled between the inverted data output terminal and a reference ground voltage to pull down a voltage on the inverted data output terminal according to the sensing signal; and
- a pull-up switch coupled between the inverted data output terminal and a reference voltage to pull up the voltage on the inverted data output terminal during a reset period.

12. The memory device according to claim 11, wherein the data holder comprises:
- a first inverter having an input terminal coupled to the data output terminal, wherein an output terminal of the first inverter is coupled to the inverted data output terminal; and
- a second inverter having an input terminal coupled to the inverted data output terminal, wherein an output terminal of the second inverter is coupled to the data output terminal.

13. The memory device according to claim 8, wherein when a stuck logic value of a defect memory cell of the memory device is a logic value 0, the page buffering circuit comprises:
- a first buffer coupled to the first bit line for temporarily storing the first read bit;
- a second buffer coupled to the second bit line for temporarily storing the second read bit; and
- a logic circuit coupled to the first buffer and the second buffer, and performing an OR logic operation on the first read bit and the second read bit to generate the readout data.

14. The memory device according to claim 8, wherein when a stuck logic value of a defect memory cell of the memory device is a logic value 1, the page buffering circuit comprises:
- a data holder having a data output terminal and an inverted data output terminal, wherein the data output terminal of the data holder is configured to output the readout data;
- a pull-down circuit coupled between the inverted data output terminal and a reference ground voltage, and configured to pull down a voltage on the inverted data output terminal during a reset period; and
- a pull-up switch coupled between the inverted data output terminal and a reference voltage, and configured to pull up the voltage on the inverted data output terminal according to the first read bit or the second read bit.

15. The memory device according to claim 14, wherein the data holder comprises:
- a first inverter having an input terminal coupled to the data output terminal, wherein an output terminal of the first inverter is coupled to the inverted data output terminal; and
- a second inverter having an input terminal coupled to the inverted data output terminal, wherein an output terminal of the second inverter is coupled to the data output terminal.

16. The memory device according to claim 8, wherein when a stuck logic value of a defect memory cell of the memory device is a logic value 1, the page buffering circuit comprises:
- a first buffer coupled to the first bit line for temporarily storing the first read bit;
- a second buffer coupled to the second bit line for temporarily storing the second read bit; and
- a logic circuit coupled to the first buffer and the second buffer, and performing an AND logical operation on the first read bit and the second read bit to generate the readout data.

17. The memory device according to claim 8, wherein the first write-in bit and the second write-in bit have a same logic value, and the first memory cell and the second memory cell are respectively disposed on adjacent bit lines.

* * * * *